United States Patent [19]

Hoshino

[11] Patent Number: 4,988,064
[45] Date of Patent: Jan. 29, 1991

[54] TILTABLE TRIPOD STAND

[75] Inventor: Yoshihiro Hoshino, Nagoya, Japan

[73] Assignee: Hoshino Gakki Co., Ltd., Japan

[21] Appl. No.: 318,145

[22] Filed: Mar. 2, 1989

[30] Foreign Application Priority Data

May 16, 1988 [JP] Japan .............................. 63-64304
Sep. 5, 1988 [JP] Japan ............................. 63-116723

[51] Int. Cl.⁵ .......................................... F16M 11/38
[52] U.S. Cl. .................................. 248/17 D; 248/165; 248/168; 248/173
[58] Field of Search ............... 248/171, 169, 167, 168, 248/170, 166, 163.21, 431, 165, 188.6, 173

[56] References Cited

U.S. PATENT DOCUMENTS

| | | | |
|---|---|---|---|
| 1,894,695 | 1/1933 | Ley | 248/171 |
| 2,282,285 | 5/1942 | Olson | 248/188.6 X |
| 2,374,021 | 4/1945 | Korling | 248/170 X |
| 2,588,399 | 3/1952 | McQuin | 248/170 X |
| 2,613,901 | 10/1952 | Tatar | 248/167 |
| 2,845,244 | 7/1958 | Prokop | 248/171 |
| 3,235,215 | 2/1966 | Lodde, Jr. | 248/170 X |
| 3,282,530 | 11/1966 | Rash | 248/170 X |
| 3,309,049 | 3/1967 | Albee, Jr. | 248/171 |
| 3,417,952 | 12/1968 | Bieschke | 248/188.6 X |
| 4,215,839 | 8/1980 | Gibran | 248/170 |
| 4,566,661 | 1/1986 | Mestler | 248/171 |

*Primary Examiner*—Ramon O. Ramirez
*Attorney, Agent, or Firm*—Ostrolenk, Faber, Gerb & Soffen

[57] ABSTRACT

A tiltable tripod stand includes a main post to be selectively tilted and three tripod legs having upper ends which are pivotally connected at the main post. One end of an articular arm is pivotally connected to each leg intermediate its ends and the other end of the arm is pivotally connected to the main post. Two related embodiments for tilting the stand are disclosed. In one, there are two upper holding members on the main post, one movable with respect to the other. One tripod leg is pivotally connected to one upper holding member and another leg is pivotally connected to the other upper holding member so that movement of the one with respect to the other changes the tilt angle of the leg and tilts the main post. In the other embodiment, there are two relatively movable lower holding members. The articular arm from one tripod leg is connected to one lower holding member while the articular arm from another leg is connected to the other lower holding member such that movement of the one lower holding member with respect to the other pivots the respective articular arms which changes the tilt angle of the respective legs which tilts the main post. In one embodiment, the legs are equally spaced around the main post. In another embodiment, the angle between the legs which the main post tilts away from is increased to improve stability.

23 Claims, 8 Drawing Sheets

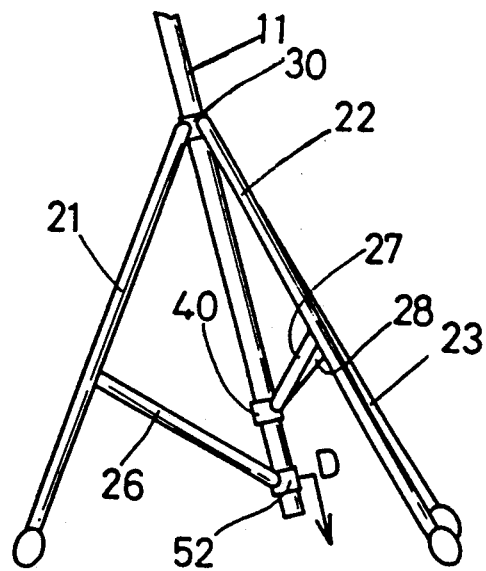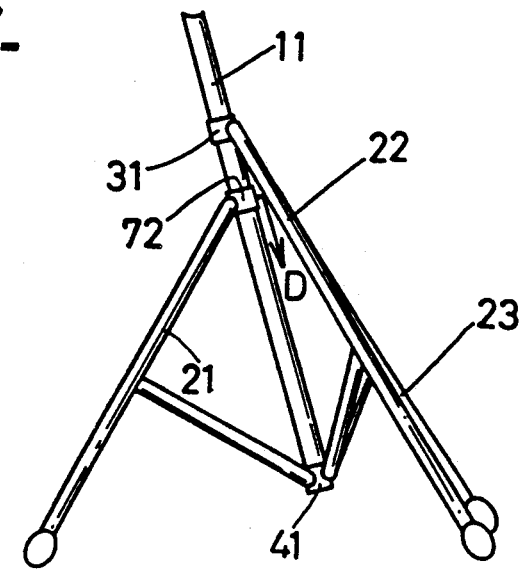

TILTABLE TRIPOD STAND

BACKGROUND OF THE INVENTION

The present invention relates to a tripod stand which is tiltable.

A conventional tripod stand for supporting an object such as a musical instrument, includes a main post, an upper holding member that axially positions and pivotally attaches the upper end of each leg of the tripod to the main post, and a lower holding member that axially attaches articular arms that are respectively connected with the intermediate part of each leg to the main post. The lower holding member is generally at the bottom of the main post of the tripod stand but may be movable along the post The upper holding member is above the lower holding member, and the upper holding member may be movable along the main post. Usually, one or the other of the upper and lower holding members is movable along the main post Through the articular arms, the movement of the movable holding member along the main post in one direction causes the opening apart or unfolding of the tripod legs, while the movement thereof in the opposite direction causes the closing together or folding of the tripod legs, and such movement also simultaneously adjusts the tilt angle or separation of all of the legs.

However where a supported object, such as a specific musical instrument, like a drum or cymbal, or a microphone should preferably be maintained nearer to the user or a particular tilt orientation is needed in connection with the setup of a plurality of percussion instruments, the absence of a tiltable function of a conventional tripod stand requires that a boom be connected with the upper portion of the stand to support the instrument, or the like. In order to connect the boom with the upper part of the main post of the stand, a special connector is also required. The center of gravity of the stand shifts when a boom is connected with the upper portion of the main post, making the stand unstable and the stand tends to fall.

SUMMARY OF THE INVENTION

The present invention is therefore directed to a tripod stand including a main post which may be held straight upright or may be tilted but which nonetheless is stable, and which also acquires further support as its tilt is increased. One or two of the three legs move outward independently of the others, which tilts the main post in the direction of the leg or legs that have been moved outward.

The movement of one or two legs separates the free ends or tips of the legs generally along the plane of tilt or in the direction of tilt of the main post. As the angle of tilt of the main post increases and the spacing between separated leg tips increases, the stability of the main post and the stand diminishes in the directions across the plane of tilt. When a force is applied directed generally across the plane of tilt, the stand is less stable, and with a great enough tilt, even a small cross directed force may cause the stand to fall. An object of the invention therefore is to improve the stability of a tripod stand with a tiltable main post.

In addition, the stand construction is simple, economical and durable Thus, the invention offers an extremely useful tripod stand.

The tripod stand of the present invention has a main post, one or more upper holding members that axially position and pivotally attach the upper portion of each tripod leg to the main post and one or more lower holding members that axially position and pivotally attach the respective articular arm for each tripod leg to the main post. Those arms are connected with an intermediate portion of each leg Either of two holding member embodiments accomplishes the main post tilting objective In the first embodiment, there are two upper holding members, which are relatively movable with respect to each other along the main post, e.g. one is stationary while the other is movable. The upper end of one tripod leg is pivotally held by one upper holding member, while the upper end of another tripod leg is held pivotally by the other upper holding member. Movement of the one upper holding member along the main post tilts the respective leg with respect to the other legs, and tilts the main post. In the first embodiment, there is preferably a single lower holding member to which the ends of all of the articular arms are connected.

In the second embodiment, there are two lower holding members, which are relatively movable with respect to each other along the main post, e.g. one is stationary while the other is movable. The end of one articular arm is held by one of the lower holding members, while the end of another articular arm is held by another lower holding member. As a result, the end of the one arm may move along the main post independently of the other articular arms as the respective lower holding member shifts along the main post. That changes the tilt angle of the leg and thus of the main post. In the second embodiment, there is preferably a single upper holding member to which the upper ends of all of the tripod legs are connected.

Initially, the usual equilateral triangle is formed by the tips of the tripod legs With either embodiment of the invention, the triangle formed by the tips of the legs may be altered into a scalene triangle wherein one of the legs is opened out at and thereby tilted at a different angle than and reaches out a different distance, e.g. further, from the center or main post, than the other two legs, thereby tilting the main post of the stand in the direction of that further outward leg of the tripod stand. The more extension in one direction, which produces the tilt, also provides additional support at that side of the stand, which compensates for the weight of any musical instrument, such as a drum, or other structure which may be supported on the main post on that side.

At the upper, or inward or attached ends of the legs, where they extend to the main post, the legs are usually 120° apart. This angular relationship would remain even when one of the legs is opened or tilted to move its tip outwardly. However, as noted above, the tilting of one leg outwardly makes the stand less stable, generally in the plane of tilt of the main post. A further embodiment of the invention, which has one leg moved outward to tilt the stand, has the angle measured at the main post between the other two legs at between 130° and 145°, or any other angle greater than 120° that is appropriate for maintaining stability of that stand especially as the main post is tilted.

Other objects and features of the present invention will become apparent from the following description of the preferred embodiments of the invention considered in conjunction with the accompanying drawings.

BRIEF DESCRIPTION OF THE DRAWINGS

FIGS. 8, 9 and 10 are schematic views corresponding essentially to the view of FIG. 2 showing arrangements of a tripod stand embodiment in which the lower holding members for the legs, are movable.

FIGS. 11, 12 and 13 are corresponding views showing arrangement of a tripod stand embodiment in which the upper holding members are movable.

DESCRIPTION OF THE PREFERRED EMBODIMENTS

Figure 1:
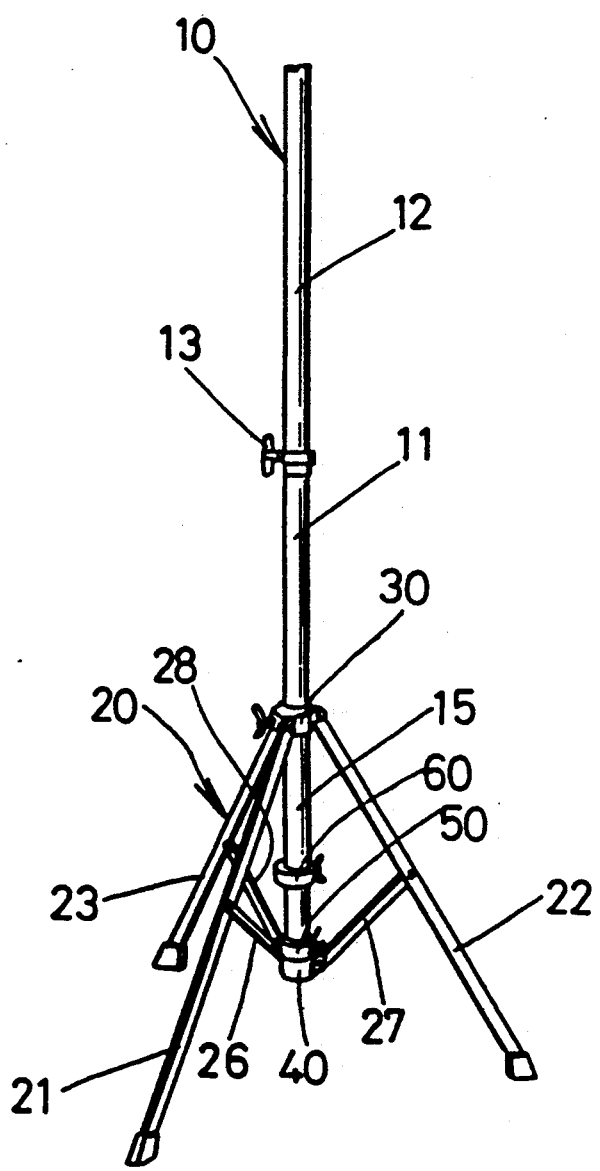
FIG. 1 is a view in perspective of one embodiment of the tripod stand of the present invention, with the stand upright.

In FIG. 1, a tripod stand 10 for musical instruments, or the like, includes a main post 11 with an expansion portion 12 connected on the main post 11 through a connection part 13 At the tip of the expansion portion 12, there are suitable tools or holding members, not shown, by which the tripod stand serves as an instrument holder, a bracket for a microphone, or for other musical devices or for carrying any other object.

A tripod part 20 is disposed at the bottom of the main post 11. The tripod part 20 comprises the three legs 21, 22 and 23 and the respective articular arms 26, 27 and 28. Each arm is pivotally connected at one of its ends with the intermediate portion of a respective leg. A tripod support portion 15 at the lower part of the main post 11 in this first embodiment includes a single upper holding member 30 that axially positions and simultaneously attaches the upper parts of the legs 21, 22 and 23 to the main post. The portion 15 further includes separate, relatively movable lower holding members 40 and 50 to which the other ends of the articular arms 26, 27 and 28 are pivotally attached for axially positioning the articular arms 26, 27 and 28 along the main post.

Figure 4:
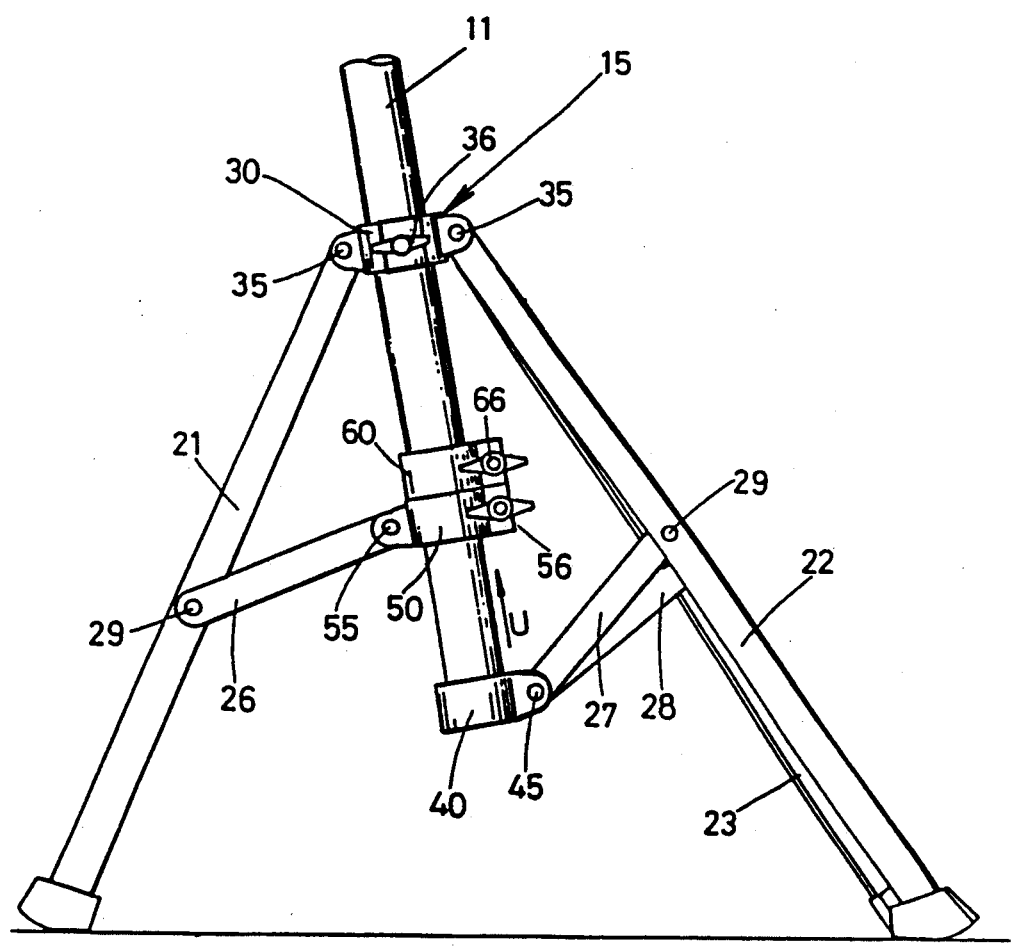
FIG. 4 is, a side perspective view of the lower end of the, tripod stand of the first embodiment in the condition of FIG. 2.

As can be observed in the side view of the tripod support portion shown in FIG. 4, the upper holding member 30 is joined with the upper parts of all of the legs 21, 22 and 23 by respective pivot pins 35, such that the legs can pivot freely inwardly and outwardly with respect to the main post. The upper holding member 30 wraps around the main post 11 and is capable of being moved along the main post 11. This establishes the tilt angle or spread of all of the legs and also enables the legs to be folded inward after use of the tripod stand or opened for supporting. A set screw 36 is provided between the member 30 and the main post 11 for axial adjustment and fixing purposes.

A first, lower holding member 40 is fixed to the lower end of the main post 11. Member 40 is pivotally joined with one end of both of the articular arms 27 and 28 of the legs 22 and 23 by means of respective pivot pins 45. Further, the other outer ends of all three articular arms 26, 27 and 28 are joined with the respective legs 21, 22 and 23 by means of respective pivot pins 29.

There is an independently movable second, lower member 50 that wraps around the post 11 and is capable of being slid along the main post 11. It is joined with the end of the articular arm 26 at the leg 21 by means of the pivot pin 55. Screw 56 is provided for tightening the member 50 on the post 11 for axial adjusting and fixing purposes. The other end of articular arm 26 is pivotally joined with the leg 21 by means of the pin 29.

Figure 2:
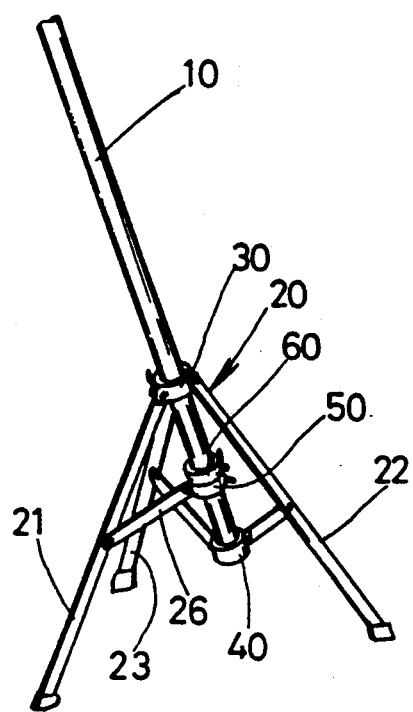
FIG. 2 shows the first embodiment of the tripod stand with the lower holding member for one of the legs moved upwardly and the stand tilted.

In FIG. 1, the main post 11 stands erect perpendicular to the ground. To tilt the leg 21, the movable lower holding member 50 is moved along the main post 11. This moves the end of the corresponding articular arm and pivots the arm. The leg 21 is thereby pivoted or tilted outwardly, to the left in FIGS. 2 and 4, by sliding the movable lower member 50 upward as indicated by arrow mark U in FIG. 4. The main post is thereby tilted to the side toward the leg 21, as shown in FIG. 2. Screw 56 is then tightened for fixing the movable lower holding member 50 at a location providing the desired angle of main post tilting.

If necessary, a stopper 60 for memory purposes is wrapped around the main post 11 It is slid into position to face the upper side of the movable lower holding member 50 and is then fixed by a fixing screw 66 to define a convenient top position for the member 50 at the time of later reuse of the tripod stand.

While the main post 11 is tilted, or when the spread or tilt angles of all the legs 21, 22 and 23 is to be adjusted, the upper holding member 30 can be suitably shifted freely along the main post and fastened where needed. This adjusts all of the legs simultaneously Since the legs and articular arms are all joined pivotally by means of pivot pins, the changes in the angle at various joints can be made easily.

Figure 3:
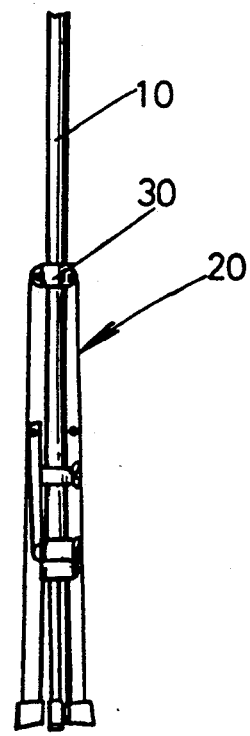
FIG. 3 is a vertical plan view of the tripod stand of FIGS. 1 and 2 in its folded condition.

FIG. 3 shows the tripod part 20 in a folded state. In this case, the single upper holding member 30 has been slid upwardly and the legs are thereby folded inward.

Figure 5:
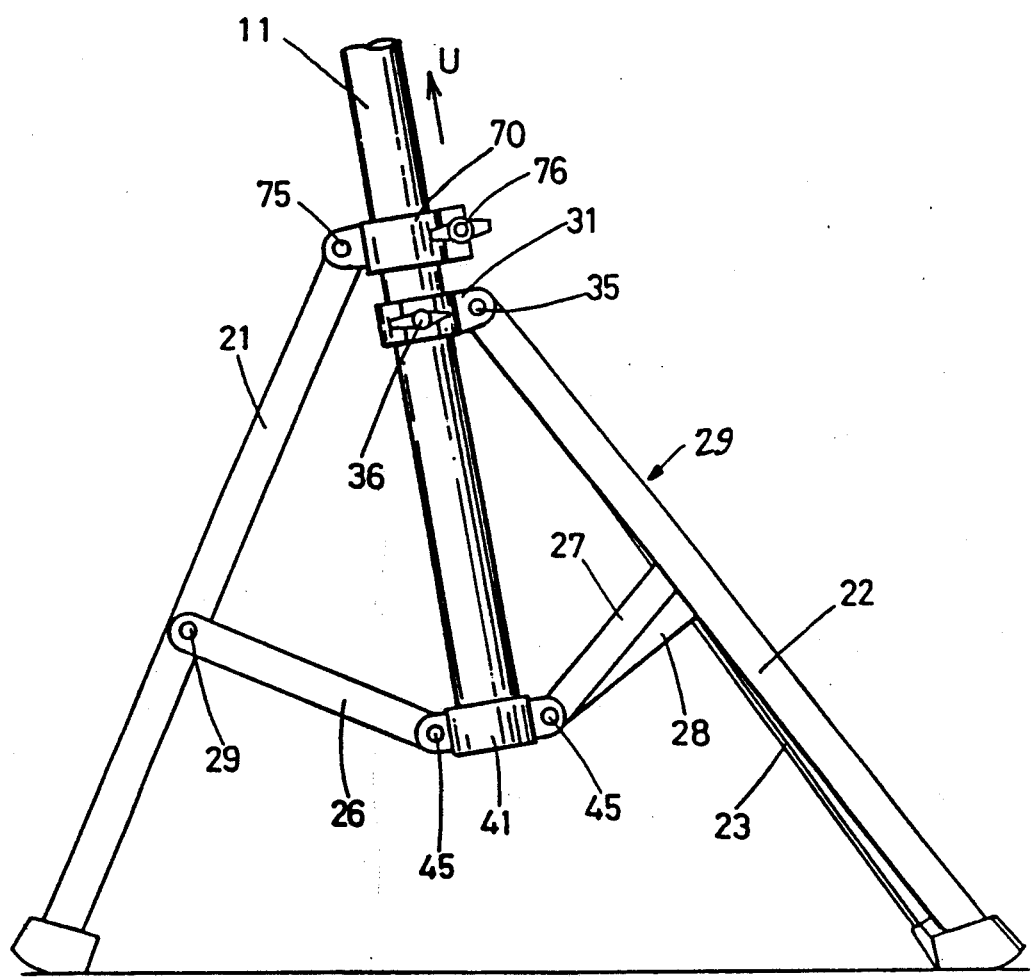
FIG. 5 is a view corresponding to FIG. 4 illustrating a second embodiment, and showing an upper holding member for one of the legs moved upwardly and the stand tilted.

The first embodiment shown in FIGS. 1 through 4 has a movable lower holding member 50. The same result can be obtained by using a movable upper holding member 70 for fewer than all of the legs in place of a movable lower holding member 50. FIG. 5 shows a second embodiment in which such a movable upper holding member 70 is provided.

In FIG. 5, the movable upper member 70 is wrapped around the main post 11. The upper part of one leg 21 is axially attached to the movable upper holding member 70 through a pivot pin 75. The movable upper holding member 70 can slide freely along the main post 11. Tightening screw 76 adjusts and axially positions the member 70.

The upper ends of the other legs 22 and 23 are axially positioned and pivotally attached to a second upper holding member 31. The upper holding member 31 is also wrapped around the main post and is also capable of independent sliding along the post. Set screw 36 between holding member 31 and post 11 fixes member 31 along the post.

The articular arms 26, 27 and 28 of the legs 21, 22 and 23 are axially positioned and pivotally attached by pivot pins 29 to a common lower holding member 41 which is fixed to the lower end of the main post 11. Movement of the common lower holding member, either with or with respect to the main post 11, moves the ends of the articular arms together and can be used to open and close the legs simultaneously.

Among the reference numbers used in FIG. 5, those which are common with FIG. 4 indicate the same parts.

Figure 6:
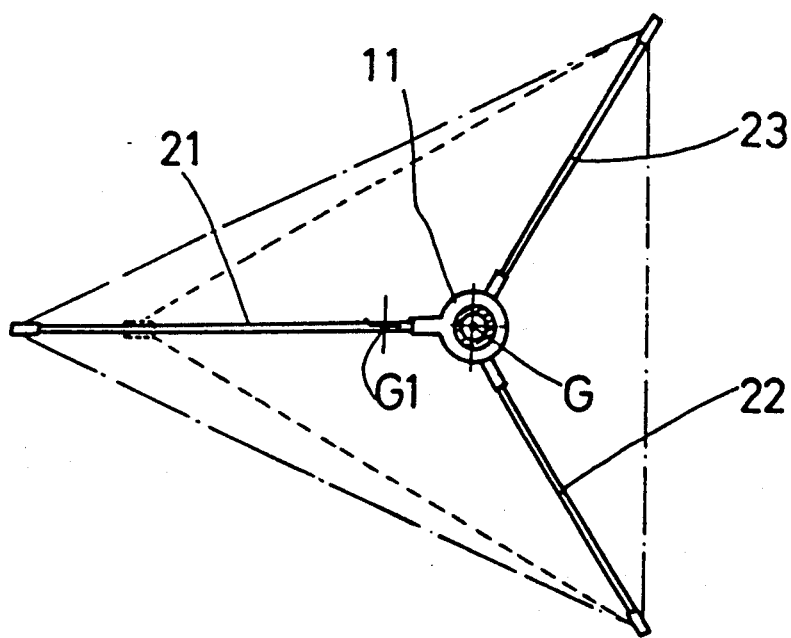
FIG. 6 is a top plan view of the tripod stand of the invention, showing the stand with one of the legs moved outwardly so that the stand is tilted and showing the angles between the legs at the main post remaining equal.

FIG. 6 is a plan view of a first leg arrangement for the tripod stand embodiments of both of Figs. 4 and 5. In both of FIGS. 4 and 5, the main post 11 is tilted toward the side of the leg 21 by opening the leg 21 outwardly from the erect position indicated by a dot-dash line in FIG. 6 to the solid line position in FIG. 6. In FIG. 4, this is done by raising lower holding member 50 for leg 21 off lower holding member 40 for legs 22 and 23. In FIG. 5, this is done by appropriately lowering upper holding member 31, for example, or by appropriately raising upper holding member 70. No matter how the leg 21 is opened to tilt the post 11 to the left in FIGS. 4 and 5 toward the leg 21, the center of gravity of the stand shifts from G to $G_1$ toward leg 21. This makes it possible for a musical instrument supported on the top of the tilted post 11 and toward the leg 21 of the stand to be held more stably. In FIG. 6, the tips of the legs 21, 22 and 23 define a scalene triangle due to the opening outward of the leg 21, as shown in solid lines in FIG. 6, rather than defining an equilateral triangle with the leg 21 not opened outward, as shown in broken lines in FIG. 6. But the angle between adjacent legs at the main post 11 remains at 120°.

Figure 7:
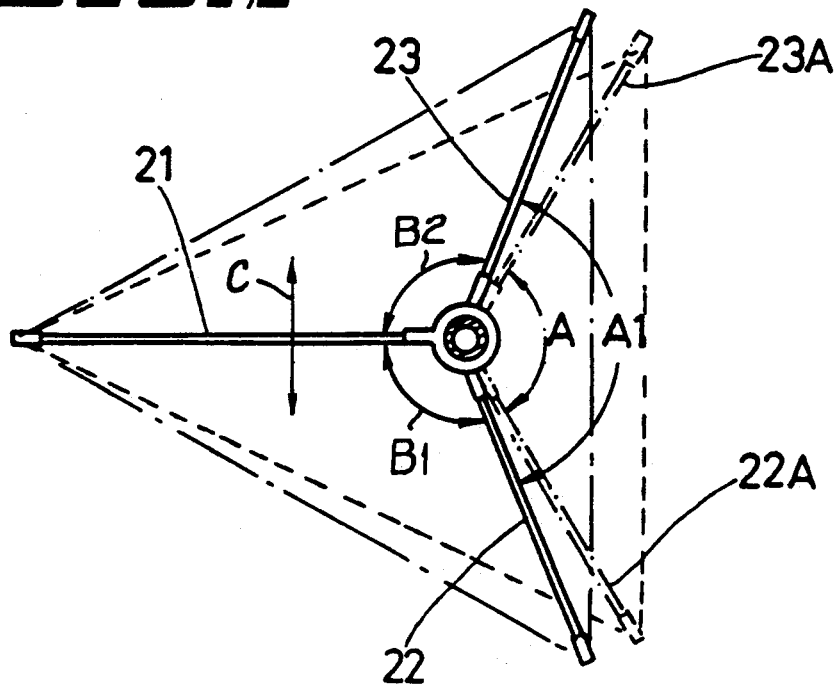
FIG. 7 is a view corresponding to FIG. 6 but showing a variation in the angular adjustment or orientation of the legs at the main post according to a variant of the invention and also showing it overlaid on the stand of FIG. 6.

Referring now to FIG. 7, with the leg 21 tilted outward and the legs at equal angles A of 120°, which is the broken line position of FIG. 7 and is also the solid line position of FIG. 6, the tripod stand tends to become unstable so that a force directed generally across the plane of tilt, that is, across the direction of tilt of the main post 11, tends to cause the stand to tip and fall generally in the direction of one of the arrows C. To avoid this, FIG. 7 shows an alternative that is adaptable for use with both of the embodiments of FIGS. 4 and 5 described above Generally stated, the angles around the main post 11 between the neighboring tripod legs has been changed from the three equal angles A of 120° to angles wherein the unopened legs 22 and 23 tend to provide more support against tilting forces applied across the plane of tilt. When the leg 21 is opened outward, the triangle that is formed by the tips of the three legs assumes a scalene triangle form in which two members that constitute the sides against the tilt direction are longer than the bottom of the triangle, as shown by the broken line in FIG. 7, and the post 11 is tilted toward the side of the leg 21.

Accordingly, reinforcement and increased stability toward the side of the stand is achieved by making the leg installation angle at the post 11, which angle is formed by the legs 22 and 23, which are the legs on the side of the stand opposite the leg 21 and opposite to the direction of tilting of the post 11, somewhat larger than 120°, that is within the range between 130° to 145°, or another angle if a particular leg tilt or use situation warrants In FIG. 7, the angle between legs 22 and 23 is increased from angle A between legs 22A and 23A to angle $A_1$ between legs 22 and 23, and the angles $B_1$ between legs 21 and 22 and $B_2$ between legs 21 and 23 are decreased accordingly While the decreases in angles $B_1$ and $B_2$ need not be identical, in a typical installation on a flat surface with the supported instrument extending directly over the tilted leg 21, the angles $B_1$ and $B_2$ should be equal, so that the increase from angle A to angle $A_1$ is equally divided in the decrease of angles $B_1$ and $B_2$. In other installations and applications where greater support is needed toward one side for a particular reason, the angles $B_1$ and $B_2$ may be selected to be different from each other. The upper and lower holding members for the legs 21, 22 and 23 orient those legs around the main post 11 at selected orientations of FIG. 6 or FIG. 7. The holding members are designed for the selected angles between two legs.

Figure 8:
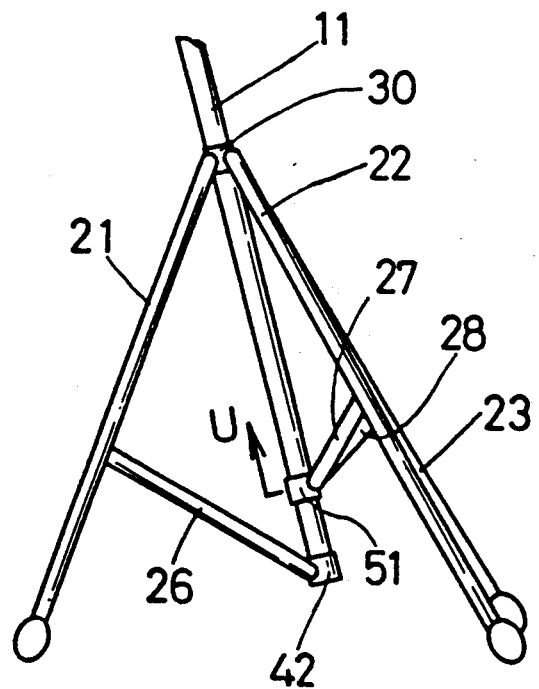
Figure 10:
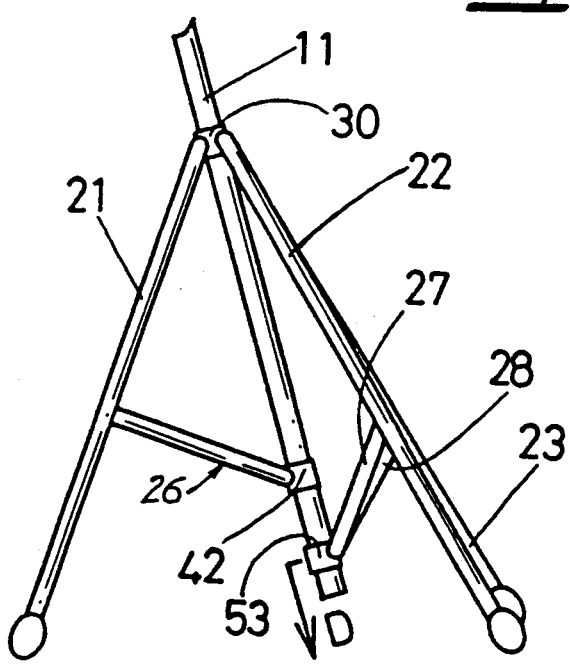

FIGS. 8, 9 and 10 are examples of variants with movable lower holding members 51, 52 or 53. Movement of the movable lower holding member up or down respective leg inwardly or outwardly with respect to the other legs. That in turn tilts the main post toward the leg tilted further outward.

The movable lower holding member 51 in FIG. 8 is pivotally attached to the articular arms 27 and 28 and is slidable (U) upward from the fixed lower holding member 42 which holds the arm 26.

The movable lower holding member 52 in FIG. 9 is pivotally attached to the articular arm 26 and is slidable (see arrow D) downward from the fixed lower holding member 40 which holds both arms 27 and 28.

The movable lower holding member 53 in FIG. 10 is pivotally attached to the articular arms 27 and 28 and is slidable downward (see arrow D) from the fixed lower holding member 42 which holds the arm 26. The lower holding member 42 and the other common reference number indicate the same parts as in the earlier examples.

Figure 11:
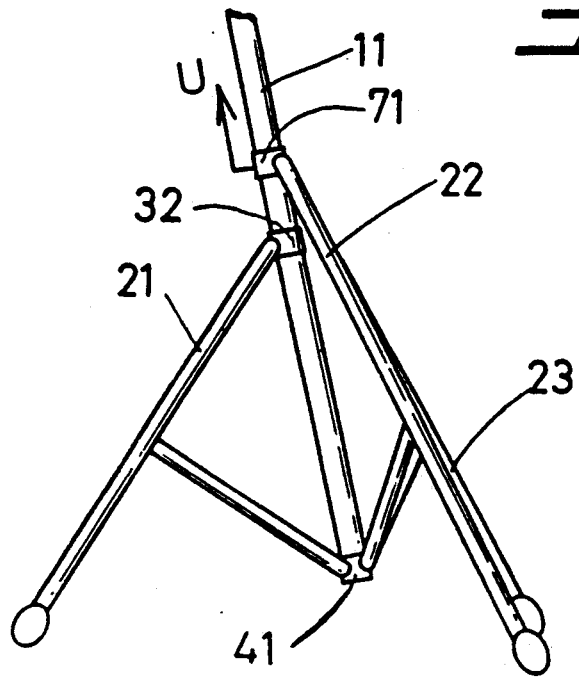
Figure 13:
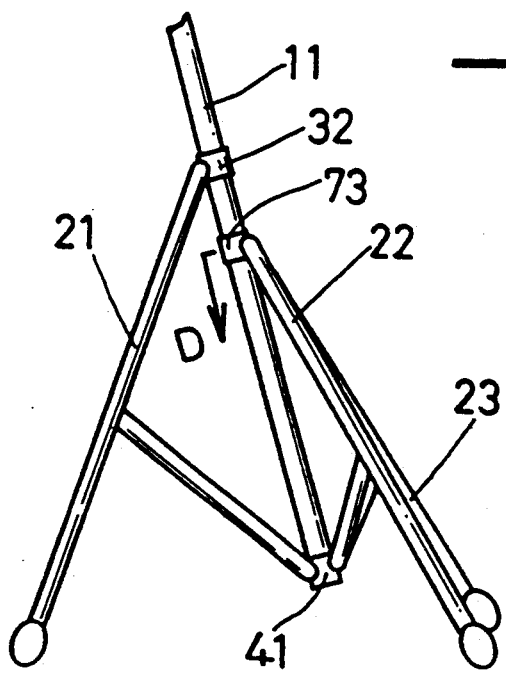

FIGS. 11, 12 and 13 show examples using a movable upper holding member 71, 72 or 73 in combination with a respective stationary lower holding member 41. Movement of the movable holding member draws up or down the attached leg or legs, and due to the articular arms attached to those legs, swings the legs and changes the tilt of the main post.

The movable upper holding member 71 in FIG. 11 is pivotally attached to the legs 22 and 23 which are slidable upward (arrow U of FIG. 11) from the fixed upper holding member 32 which holds the leg 21.

The movable upper holding member 72 in FIG. 12 is pivotally attached to the leg 21 which is slidable downward (arrow D of FIG. 12) from the fixed upper holding member 31 which holds the legs 22 and 23.

The movable upper holding member 73 in FIG. 13 is pivotally attached to the legs 22 and 23 which are slid downward from the fixed upper holding member 32 which holds the leg 21.

As has been explained above, the tripod stand of the invention is capable of tilting the main post to a desired angle by a simple structure through one or two of the three legs being shifted along the main post independently of the other legs, which through the articular arms creates a difference in the opening angles of the legs. Since the center of gravity of the stand also shifts in the direction of tilting upon the tilting of the main post, the stability of the stand is improved as compared with the conventional boom type stand.

The angles between neighboring legs around the main post are typically equal. To avoid the instability of the stand in the directions generally across the plane of tilt or across the direction of tilt of the main post, the angles between the legs at the main post are altered from equal angles such that the angle between the two legs opposite the leg that has been opened outward is made larger around the main post, causing the angles between the legs at the main post to be unequal. This increases the stability of the stand against forces generally across the plane of tilt of the main post.

In the foregoing the present invention has been described in connection with preferred illustrative embodiments thereof. Since many variations and modifications of the present invention will now be obvious to those skilled in the art it is preferred that the scope of this invention be determined not by the specific disclosures herein contained but only by the appended claims.

What is claimed is:

1. A tiltable tripod stand comprising:
   a main post;
   three tripod legs, the legs having respective upper ends for being secured on the post, the legs having respective lower ends for resting on the surface on which the tripod stand is supported;
   a respective articular arm pivotally attached at one location on each leg intermediate the ends of the leg and also pivotally attached at one location on the post, wherein movement of the upper ends of the legs with respect to the main post, through the articular arms, selectively folds the legs together to close the stand and opens the legs apart forming the bottom ends of the legs into a triangle which supports the tripod stand;
   at least two upper holding members being supported on the main post, with at least one or the other of the upper holding members being movable along the main post;
   two of the legs at the upper end thereof being pivotally connected with the one upper holding member and the third leg at the upper end thereof being pivotally connected with the other upper holding member, such that movement of the one upper holding member or the other upper holding member changes the shape of the triangle defined by the bottom ends of the tripod legs which tilts the main post toward one of the legs.

2. The tiltable tripod stand of claim 1, wherein the one upper holding member is movable along the post while the other upper holding member is supported stationary on the post.

3. The tiltable tripod stand of claim 2, wherein the movable one upper holding member is located above the stationary other upper holding member along the main post.

4. The tiltable tripod stand of claim 2, wherein the movable one upper holding member is located below the stationary other upper holding member along the main post.

5. The tripod stand of claim 1, wherein the other of the upper holding members is wrapped around the main post.

6. The tiltable tripod stand of claim 1, wherein the one upper holding member is stationary on the main post while the other upper holding member is movable along the main post and the legs and the articular arms are so connected to the main post that the two legs on the one upper holding member are not opened outwardly, and the angle formed around the main post between the two legs on the one upper holding member is larger than the angle formed around the main post between the third leg and either of the other two legs.

7. The tiltable tripod stand of claim 1, wherein the legs and the articular arms are connected to the main post at equally spaced angles around the main post.

8. A tiltable tripod stand comprising:
   a main post;
   three tripod legs, the legs having respective upper ends for being secured on the post, the legs having respective lower ends for resting on the surface on which the tripod stand is supported;
   a respective articular arm pivotally attached at one fixed location on each leg intermediate the ends of the leg and also pivotally attached at one fixed location on the post, wherein movement of the upper ends of the legs with respect to the main post, through the articular arms, selectively folds the legs together to close the stand and opens the legs apart forming the bottom ends of the legs into a triangle which supports the tripod stand;
   at least two upper holding members being supported on the main post, with at least one of the upper holding members being movable along the main post with respect to the other upper holding member;
   at least one of the tripod legs at the upper end thereof being pivotally connected with the one upper holding member, at least one other of the legs at the upper end thereof being pivotally connected with the other of the upper holding members, and the third leg being pivotally connected with one or the other of the upper holding members, such that movement of the one upper holding member with respect to the other upper holding member moves one of the legs selectively inwardly or outwardly of the main post with respect to the one other leg, for changing the shape of the triangle defined by the bottom ends of the tripod legs which tilts the main post toward one of the legs.

9. The tiltable tripod stand of claim 8, wherein one of the legs is opened outward for tilting the main post toward the one leg as the one leg is opened outward; the two legs with the larger angle between them are the legs that are not opened outward.

10. The tiltable tripod stand of claim 9, wherein the larger angle is in the range of 130° to 145°.

11. A tiltable tripod stand comprising:
    a main post;
    three tripod legs, the legs having respective upper ends for being secured on the post, the legs having respective lower ends for resting on the surface on which the tripod stand is supported;
    a respective articular arm pivotally attached to each leg intermediate the ends of the leg and pivotally attached to the post, wherein movement of the upper ends of the legs with respect to the main post, through the articular arms, selectively folds the legs together to close the stand and opens the legs apart forming the bottom ends of the legs into a triangle which supports the tripod stand;
    the legs being held at their upper ends to be supported to be pivotable with respect to the main post;
    at least two lower holding members supported on the main post, with at least one of the lower holding members being movable along the main post with respect to the other lower holding member;
    at least one of the articular arms being pivotally connected to the one lower holding member for thereby being moved along the main post along with the one lower holding member; at least one other of the articular arms being pivotally connected with the other lower holding member such that movement of the one lower holding member along the main post with respect to the other lower holding member, for moving the respective articular arm therealong, in turn selectively moves the respective leg connected with the moved articular arm inward or outward of the main post, for changing the shape of the triangle defined by the bottom ends of the tripod legs, which tilts the main post toward one of the legs.

12. The tiltable tripod stand of claim 11, wherein the one lower holding member is movable along the post while the other lower holding member is supported stationary on the post.

13. The tiltable tripod stand of claim 12, wherein the one lower holding member is located above the other lower holding member along the main post.

14. The tiltable tripod stand of claim 12, wherein the one lower holding member is located below the other lower holding member along the main post.

15. The tiltable tripod stand of claim 12, wherein two of the articular arms are connected at their ends to the one lower holding member.

16. The tiltable tripod stand of claim 12, wherein one of the articular arms is connected at its end to the one lower holding member.

17. The tiltable tripod stand of claim 11, wherein the legs and the articular arms are connected to the main post at equally spaced angles around the main post.

18. The tiltable tripod stand of claim 11, wherein the legs and the articular arms are connected to the main post so that the angle between the two legs which are not opened outward is larger than the angles between other two legs.

19. The tiltable tripod stand of claim 18, wherein one of the legs is opened outward for tilting the main post toward the one leg as the one leg is opened outward; the two legs with the larger angle between them are the legs that are not opened outward.

20. The tiltable tripod stand of claim 19, wherein the larger angle is in the range of 130° to 145°.

21. The tiltable tripod stand of claim 12, further comprising a stop positioned on the main post for halting movement of the one lower holding member along the post beyond the stop.

22. The tripod stand of claim 12, wherein the lower holding members are wrapped around the main post.

23. A method of operating a tripod stand, the tripod stand including a main post, three legs with upper and lower ends, two lower holding members, and articular arms which are connected to the holding members, the method comprising the steps of:

opening the legs apart by moving the upper ends of the legs with respect to the main post; and tilting the main post toward one of the legs by moving one of the holding members with respect to the other.

* * * * *